United States Patent [19]
Gibson

[11] Patent Number: 5,412,873
[45] Date of Patent: May 9, 1995

[54] RECIPROCATING HEDGE TRIMMER TOOL HAVING CUTTING TEETH WITH ASYMMETRICAL GUARD PORTIONS

[75] Inventor: Duane M. Gibson, Milwaukie, Oreg.

[73] Assignee: Blount, Inc., Portland, Oreg.

[21] Appl. No.: 95,600

[22] Filed: Jul. 21, 1993

[51] Int. Cl.$^6$ ............................................. B26B 9/02
[52] U.S. Cl. ............................... 30/355; 56/DIG. 17; 56/DIG. 20; 56/297; 56/158; 30/196; 30/216
[58] Field of Search ......................... 56/158, 232–236, 56/255, 257, 264, 297, 296, 295; 30/216–220, 225, 228, 196, 355; 83/855, 854

[56] References Cited

U.S. PATENT DOCUMENTS

| | | |
|---|---|---|
| 470,578 | 3/1892 | Kidd . |
| 1,832,993 | 11/1931 | Masek . |
| 2,558,459 | 6/1951 | Podner . |
| 2,763,925 | 9/1956 | Asbury . |
| 3,143,798 | 8/1964 | Lundquist . |
| 3,193,925 | 7/1965 | Hawley . |
| 3,293,746 | 12/1966 | Maxson . |
| 3,538,693 | 11/1970 | Hast . |
| 3,623,223 | 11/1971 | Edgell et al. . |
| 3,751,805 | 8/1973 | Grahn . |
| 3,848,401 | 11/1974 | Hast . |
| 4,592,143 | 6/1986 | Pizzuto et al. . |
| 4,782,731 | 11/1988 | Huntington ............................ 56/255 |
| 5,138,908 | 8/1992 | Raetz et al. . |

FOREIGN PATENT DOCUMENTS 882465  11/1981  U.S.S.R. .

Primary Examiner—Michael Powell Buiz
Assistant Examiner—Pamela O'Connor
Attorney, Agent, or Firm—Robert L. Harrington

[57] ABSTRACT

A hedge trimmer blade assembly preferably a double acting assembly having upper and lower reciprocating blades. Superimposed cutting teeth extend laterally from the sides of the assembly from each of the blades. Guard portions extend from the teeth of the upper blade only on one side and from the teeth of the lower blade only on the other side. The guard portions are asymmetrical with a straight side and a tapered side, the taper preferably including a shallow bevel near the base and a sharper bevel near the tip of the guard portion. The cutting teeth of both upper and lower blades on both sides form oval shaped cutting chambers with cooperative hook configurations at the entry to the cutting chambers. The upper and lower blades are preferably identical in configuration but inverted one relative to the other in the assembly. The straight sides of the guard portions are all faced toward the power head of the trimmer to produce a hooking action as the user sweeps the trimmer during operation.

6 Claims, 3 Drawing Sheets

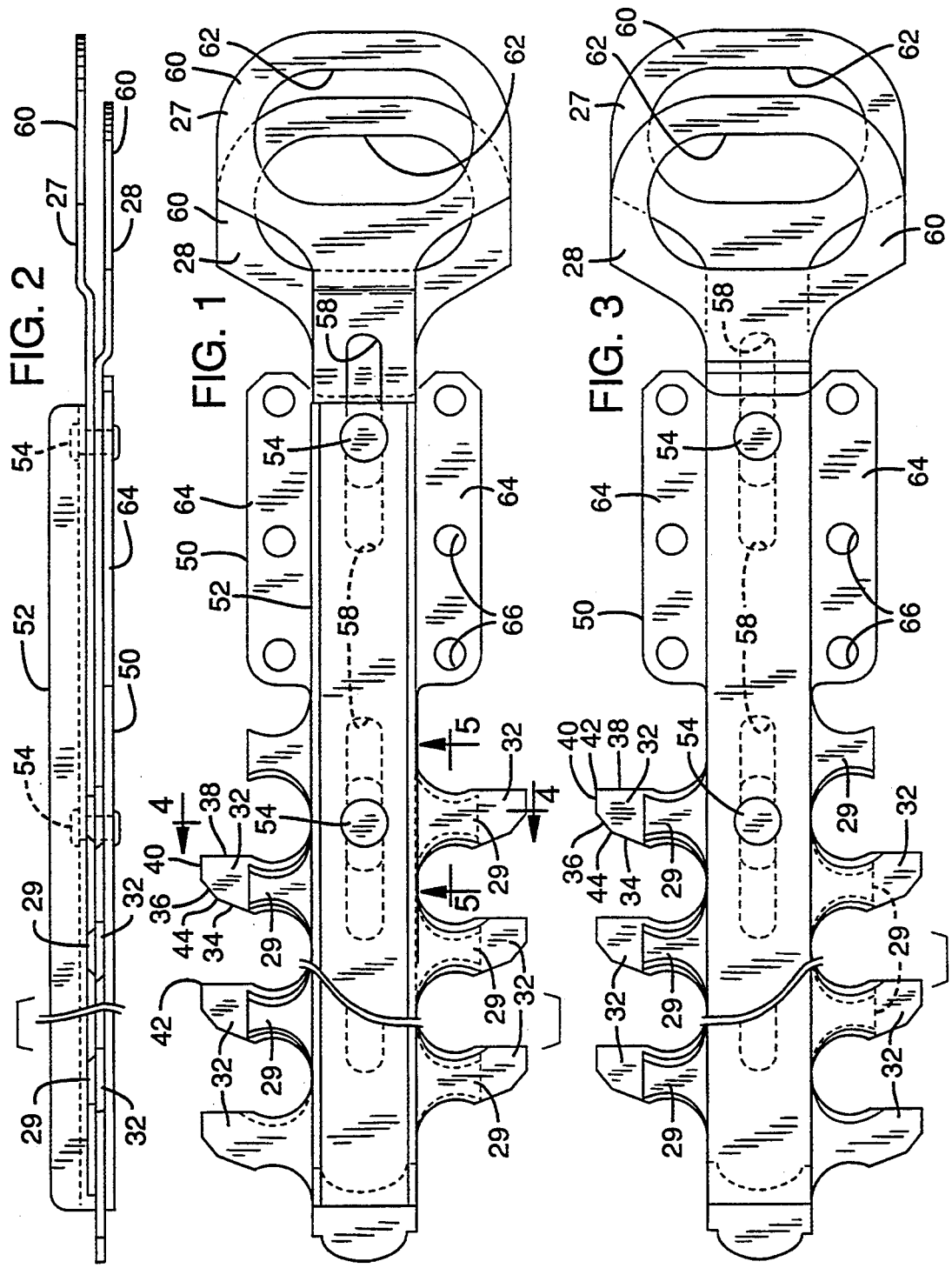

RECIPROCATING HEDGE TRIMMER TOOL HAVING CUTTING TEETH WITH ASYMMETRICAL GUARD PORTIONS

FIELD OF THE INVENTION

This invention relates to hedge trimmers and more particularly to hedge trimmers with double acting blade assemblies, the blades having cooperative teeth configurations that improve the feeding of materials into the cutting chambers of the blades.

BACKGROUND OF THE INVENTION

Hedges as contemplated for trimming with the present tool, typically consist of stem diameters ranging from the very slim or fine stems to stems having diameters approaching three-quarters of an inch. A trimmer having double acting blades has a scissors-like action whereby a pair of cutting blades have laterally projected sharpened teeth providing cutting edges that move back and forth in opposite directions. The opposing reciprocation of the cutting teeth causes the teeth to first move apart to create an opening between the teeth in which the hedge materials enter and then they move together to sever those materials. Hereafter the opening between the cutting teeth are referred to as cutting chambers.

There are a number of the features that are common to a double acting hedge trimmer. The cutting chamber has an opening that allows entry of materials. A hood shape is provided at the entry to the cutting chamber to grab and draw the hedge material into the opening. A guard portion extends outwardly of the cutting teeth of one of the blades, i.e., the guard portion protrudes beyond the cutting edge. The adjacent guard portions in response to an established safety regulation, cooperate to prevent entry of a circular stem having a three-quarter inch diameter. That is, no portion of the three-quarter inch stem is allowed to enter the cutting chamber. Thus, the guard portions are configured to have inwardly directed abutments spaced outwardly from the cutting chamber entry and forming a gate or throat through which the hedge materials must pass in order to enter the cutting chamber. A three-quarter inch diameter stem will engage the abutments and thereby be prevented from entering the cutting chamber, i.e., the reciprocating cutting edges will not cut into the stem.

The above requirement of the guard portion generates several problems. The guard portion's outer tip cannot be allowed to have a broad edge that engages the hedge material. If the tip is broad, the hedge material is simply pushed away from and under the blade assembly and doesn't get cut. Thus, the guard portion is formed like an arrowhead, with the base of the head defined by the hook shaped entry into the cutting chamber, and with the sides angled inwardly first to the point of abutment (where the three-quarter inch stem is rejected) and then to a narrow. Whereas the safety regulation, hook shaped grabbing, and narrow tip features are satisfied, the resulting angled sides of the guard portion act as camming surfaces to cam the stems away rather than into the cutting chamber.

BRIEF DESCRIPTION OF THE INVENTION

The present invention provides, as the preferred embodiment, a guard portion for the cutting teeth of a trimmer blade that is uniquely configured to satisfy the above-described safety requirements while permitting relatively larger stems into the cutting chamber, i.e., stems that more closely approach the three-quarter inch stem diameter. Also, it reduces or eliminates the camming action that cams materials out of the cutting chamber.

In brief, the guard portions of the present blade assemblies are configured to be non-symmetrical (asymmetrical) with one side that is straight and the other side having a taper that is preferably a double bevel. Whereas adjacent teeth form the throat or gate into the cutting chamber, one side of the throat is accordingly straight sided and the other side has the double bevel. The taper or double bevel provides narrowing of the tooth tip. The transition from an inner shallow bevel to an outer sharper bevel forms one point of restriction for the three-quarter inch diameter, and the extreme tip of the straight side provides the opposed point of restriction. (The two points equate to the points of abutment on the sides of the arrowhead shape of FIG. 7.) The configuration of the throat of the present configuration establishes a point of restriction that is closer to the guard tip (the extreme outer end) than is the case in the arrowhead guard tip. The sides of the throat from the points of restriction extend to the entry of the cutting chamber. However, because both sets of teeth include the hook shape, the entry can be made with a larger opening and still satisfy the same criteria for the trimmer blade as described above. Because the sides are no longer required to angle inwardly in the manner of an arrowhead shape, the camming away of the materials is largely eliminated. Still further, because the trimmer blade assembly is typically moved in a sweeping arc by the user, by arranging the throat configuration so that the outer side of the throat has the straight side, this sweeping movement creates a hooking affect that draws material into the throat rather than camming it away from the throat as in the prior device.

These and other benefits will become more apparent upon reference to the following detailed description having reference to the enclosed drawings.

DETAILED DESCRIPTION OF THE DRAWINGS

FIG. 1 is a top view of a double acting hedge trimmer blade assembly in accordance with the present invention, illustrating the upper blade relative to the lower blade, positioned to the extreme right as viewed in the drawing;

FIG. 2 is a side view of the blade assembly bar of FIG. 1;

FIG. 3 is a bottom view of the blade assembly trimmer of FIG. 1;

Figure 7:
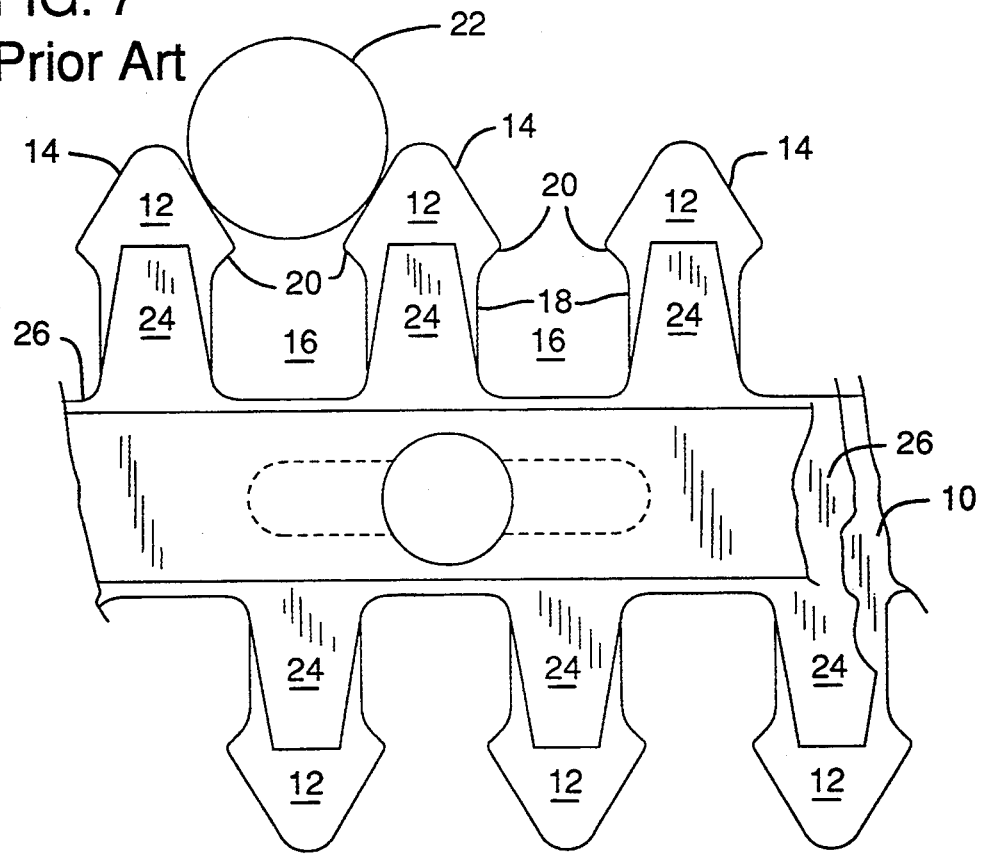

With reference to the prior art drawing of FIG. 7, a lower blade 10 carries cutting teeth 12 with guard portions or extensions 14 extended outwardly from the teeth 12 and which are configured to resemble arrowheads. As illustrated, a cutting chamber 16 is defined by the opposed curved, sharpened edges 18 of opposed teeth 12 on blade 10. The upper ends of the sharpened edges 18 (which is also the base of the arrowhead shape) establishes entry 20 into the cutting chamber 16. As noted these upper ends forming entry 20 are hook shaped and are designed to grab (or contain or capture) material that protrudes into the entry. The upper blade 26 includes cutting teeth 24 which reciprocate opposite the reciprocation of blade 10. Teeth 24 extend to the entry 20 of the cutting chamber and cooperate with teeth 24 to cut materials that protrude into the cutting chamber 16.

Also illustrated in FIG. 7 is a testing dowel 22 of three-quarter inch diameter used to test the design of the hedge trimmer blade for satisfaction of the previously mentioned safety regulation. As noted, the dowel 22 engages the angled sides of the adjacent guard portions 14 at a point above the entry 20 with the bottom of the dowel spaced upwardly from the cutting chamber entry. No portion of the dowel 22 protrudes into the cutting chamber 16 to be in the path of the cutting teeth 24 of upper blade 26.

Figure 6:
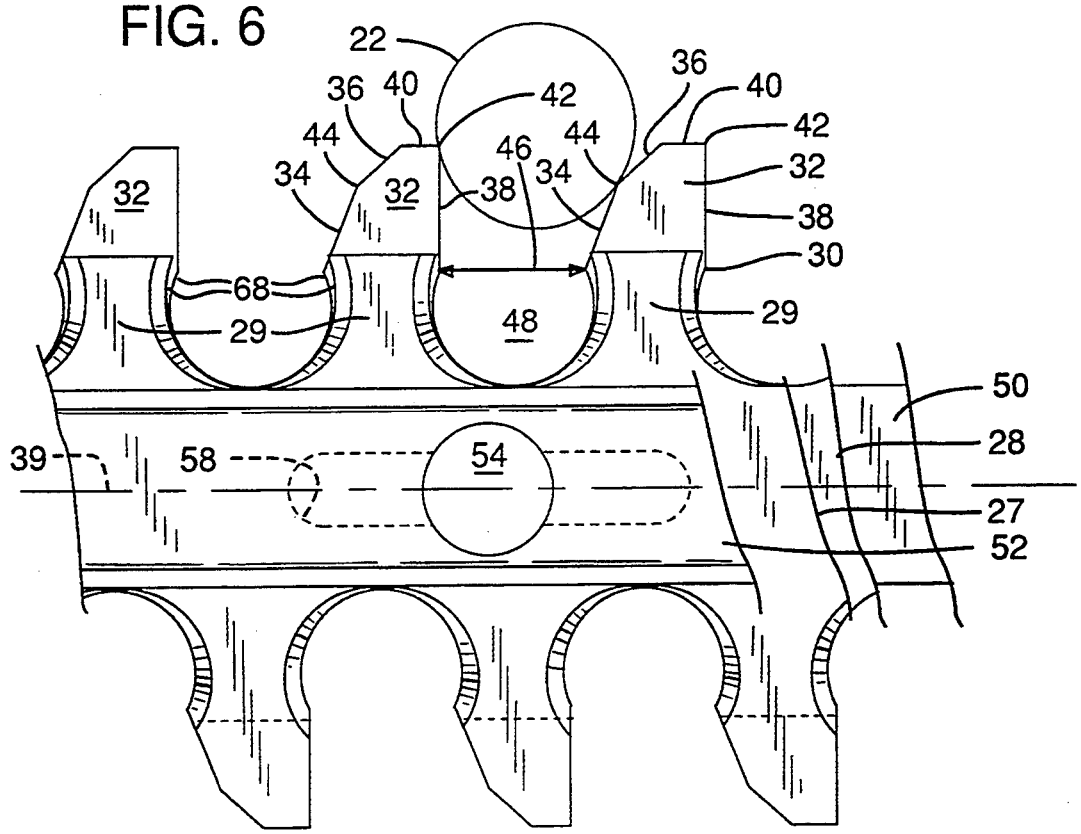
FIGS. 6 and 7 are enlarged plan views of comparable portions of the blade assemblies of the present invention (FIG. 6) and the prior art (FIG. 7)

Reference is now made to FIG. 6 which illustrates a preferred embodiment of the present invention. In FIG. 6 (with reference only to the laterally projected teeth illustrated at the top side in the figure) the lower blade 28 carries teeth 30 having guard portions or extensions 32. The guard extensions 32 are asymmetrical. That is, the left side of the guard portion (as viewed in FIG. 6) is double beveled with a shallow lower bevel 34 and a sharper upper bevel 36. The right side of the guard portion has a straight side 38, i.e., it extends substantially at right angles to the lengthwise axis 39 of the trimmer. The double bevel is designed to close the distance between the two sides so that the tip 40 of the guard has a narrow landing. It will be appreciated that the bevel surfaces 34, 36 and tip 40 may be formed by a curving line rather than the straight lines illustrated.

The effect of the asymmetrical configuration as compared to the prior art is illustrated in part by the same testing dowel 22. The dowel 22 is restricted by the corner 42 between side 38 and tip 40 on one side and the corner 44 between bevel surface 34 and bevel surface 36 on the other side. The shallow bevel surface 34 and the straight side 38 below points 42 and 44 provide a more open throat. FIGS. 6 and 7 are drawn substantially to the same scale and a comparison of the opening of entry 46 in FIG. 6 with the opening of entry 20 in FIG. 7 will demonstrate this point. Thus, although the same safety regulations or requirements are satisfied, the more open throat of entry 46 permits larger stems to enter the cutting chamber 48.

The upper blade 27 of FIG. 6 includes teeth 29. As will be noted, the configuration of the cutting edges of teeth 29 is substantially the same as the cutting edges of teeth 30 (that portion below the entry 46 and which edges are designated by reference 68). It is believed that a primary factor of the FIG. 6 embodiment that permits the larger entry 46 is the provision of the hook shaped configuration for both the upper and lower cutting teeth 29, 30. Note from the prior art trimmer of FIG. 7 that as the upper teeth 24 move across the cutting chamber 16 toward cutting teeth 12, cutting teeth 24 do not contribute to the hooking or grabbing action. Thus, the hook shape of teeth 12 is required to be more severe to accomplish the same desired grabbing effect. In FIG. 6 both the upper and lower teeth 29, 30 are hook shaped and their cooperative action produces similar grabbing with a less severe hook shape.

Whereas the above disclosure deals primarily with the features that distinguish the present invention from the prior art, the full structure of the present invention will now be described in detail with reference to FIGS. 1-5.

Figure 4:
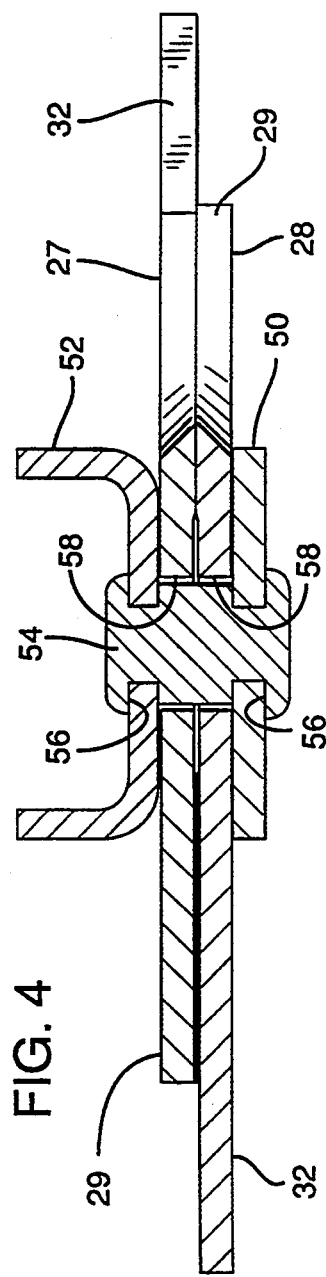
FIG. 4 is a cross section view as viewed on section lines 4—4 of FIG. 1.
Figure 5:
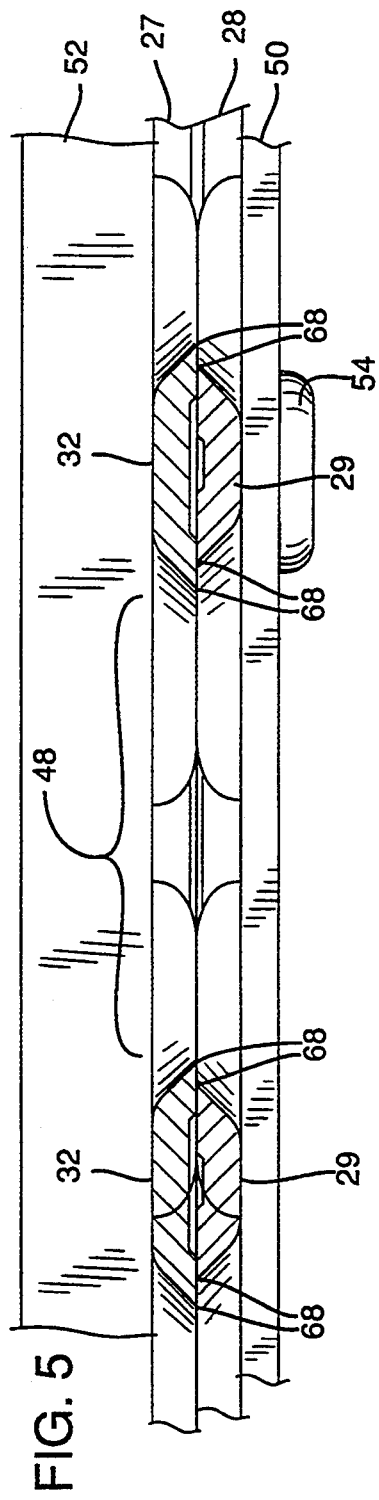
FIG. 5 is a partial sectional view as viewed on lines 5—5 of FIG. 1.

From FIG. 4 which illustrates the hedge trimmer in cross section as viewed on view lines 4—4 of FIG. 1, there is a bottom bar 50, a top bar 52 and intermediate these bars is the lower blade 28 and upper blade 27 previously discussed. The bars and blades are secured together with rivets 54. As will be noted from FIG. 4, the rivets 54 as formed to have upper and lower grooves 56 which secures the bars 50 and 52 in spaced apart relation. The upper and lower blades have elongated slots 58 which allow the blades to axially reciprocate relative to bars 50, 52.

As seen in FIGS. 1 and 2, each of the blades 27, 28 have a rearwardly extending ear 60 with an oval shaped opening 62. The openings 62 of ears 60 provide a cam follower for a cam drive which is common for double action trimmers and will not be illustrated or described in detail. In brief, a rotary cam provided on the trimmer's power head protrudes into the openings 62 and forces reciprocation of the blades in opposite directions. The blade assembly is secured to the power head by side flanges 64 extended laterally from bottom bar 50. Bolt holes 66 are provided in flanges 64 for receiving bolts which screw through the bolt holes and into the housing of the power head.

It will be noted that upper and lower blades 27, 28 are near duplicates. Whereas the top teeth of lower blade 28 include the guard portions 32, the bottom teeth do not. The reverse is true for the upper blade, i.e., the top teeth of the upper blade do not include guard portions and the bottom teeth do. One can simply turn the upper blade over and it will have an identical configuration to that of the lower blade. The provision of the cutting edges 68 for the cutting teeth is described in the commonly owned U.S. Pat. No. 5,138,908, issued Aug. 18, 1992 and will not be described here in detail.

Figure 8:
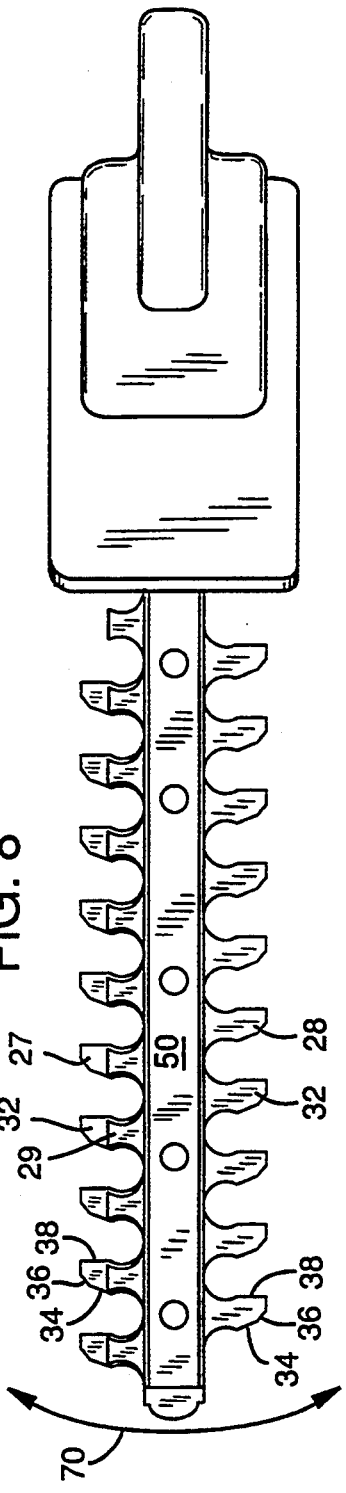
FIG. 8 is a schematic illustration of the cutting action of the trimmer of FIG. 1.

FIG. 8 illustrates the typical cutting action of a hedge trimmer being operated by a user but using the hedge trimmer of the present invention. As will be noted, the action is a sweeping action with the blades moved in an arc 70. Regardless of whether the user is cutting left to right or right to left, the straight side 38 of the guard portion 32 is facing toward the user and the curved or beveled side 34, 36 faces away from the user. The effect of the sweeping action in combination with the reciprocating action of the blade is to hook the hedge material and guide it into the cutting chamber. Compare this action with that of the prior art guard portions of FIG. 7 wherein the arrowhead shape acts to deflect material away from the cutting chamber.

In summary, the blade assembly of the present invention as compared to the prior art is cheaper to manufacture, the guard portions are designed to avoid the camming away or deflection of the hedge material, and the guard portion satisfies the same safety regulations while providing a more open throat for the cutting of larger diameter stems.

These and other advantages will be apparent to those skilled in the art and numerous variations and modifications may be made without departing from the invention as defined in the appended claims. For example, whereas the invention is illustrated for use with a double acting blade, it is believed that it will have beneficial application to trimmer blades having a single reciprocating cutting blade.

What is claimed is:

1. A hedge trimmer blade assembly comprising: elongated upper and lower blades each having opposed sides, said blades connected together in superimposed relationship for relative lengthwise axial reciprocation, cutting teeth laterally projected from the same side of both of said upper and lower blades whereby the cutting teeth of the upper blade overlies the cutting teeth of the lower blade, the cutting teeth having cutting edges that define cutting chambers and entries into said cutting chambers, and the teeth of one of said blades only having guard portions laterally extended beyond the cutting chamber, adjacent guard portions cooperatively defining a restrictive throat leading to the cutting chamber entry, said guard portions extending from a base at the cutting chamber entry to a tip at its extreme outer end, said guard portion having a non-symmetrical configuration with one side extending substantially perpendicularly relative to the axial length of the assembly and an opposite side tapered from the base to the tip to form a narrow landing at the tip of the guard portion, said throat formed by adjacent guard portions including a straight side and a tapered side of the adjacent guard portions, and said sides cooperatively defining a restriction to prevent oversize stems from entering the cutting chamber.

2. A hedge trimmer blade assembly as defined in claim 1 wherein the cutting edges of both upper and lower teeth are concavely curved and define oval shaped cutting chambers, said cutting edges of adjacent teeth of both the upper and lower blades thereby having a hook shape at its outer edge that defines the cutting chamber entry and cooperatively provides a hooking action to draw hedge material into the cutting chamber.

3. A hedge trimmer blade assembly as defined in claim 1 wherein the cutting teeth are laterally projected from both sides of both upper and lower blades and said guard portions are provided on the teeth of the upper blade extended from one side and from the teeth of the lower blade extended from the opposite side, said upper and lower blades have substantially similar overall configurations with one blade inverted relative to the other blade whereby both blades can be blanked and formed in a similar manufacturing operation.

4. A hedge trimmer blade assembly as defined in claim 1 wherein said tapered side is provided by a double bevel to form a throat configured with a sharp angle starting at the tip and converts to a shallow angle into the cutting chamber entry.

5. A hedge trimmer blade assembly as defined in claim 1 wherein said assembly is designed for mounting one end to a power head of a hedge trimmer, said hedge trimmer adapted for trimming in a sweeping action whereby the opposite end of the trimmer is moved in an arc, and said guard portions arranged on said cutting teeth whereby all the throats have the straight side facing toward the power head end to provide a hooking as opposed to camming action of hedge materials engaged thereby.

6. A hedge trimmer blade assembly as defined in claim 1 wherein the cutting blades are captured between upper and lower mounting bars, and both of said cutting blades are mounted to said mounting bars to be reciprocally moved relative to each other to provide a double acting trimmer blade assembly.

* * * * *